(No Model.) 2 Sheets—Sheet 2.
E. W. VANDUZEN.
DEVICE FOR PURIFYING THE WATER OF BOILERS.
No. 328,548. Patented Oct. 20, 1885.
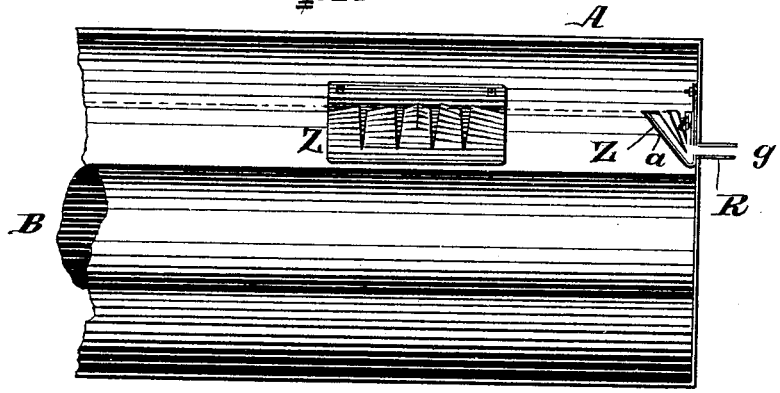
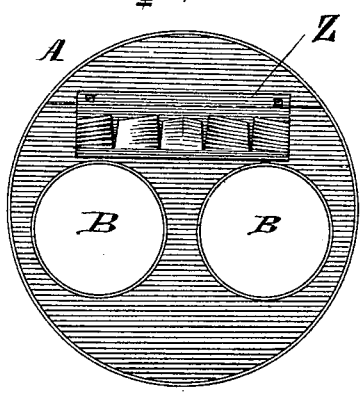
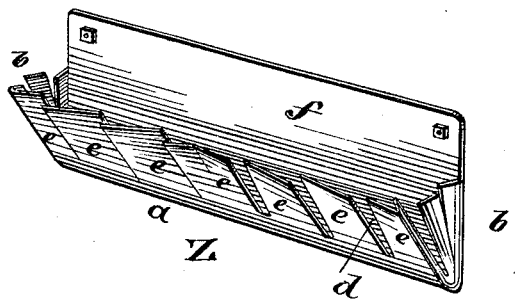
Attest.
O. M. Hill
Jno. W. Strehli
Inventor.
Ezra W. Vanduzen
per Wm. Hubbell Fisher,
Atty.

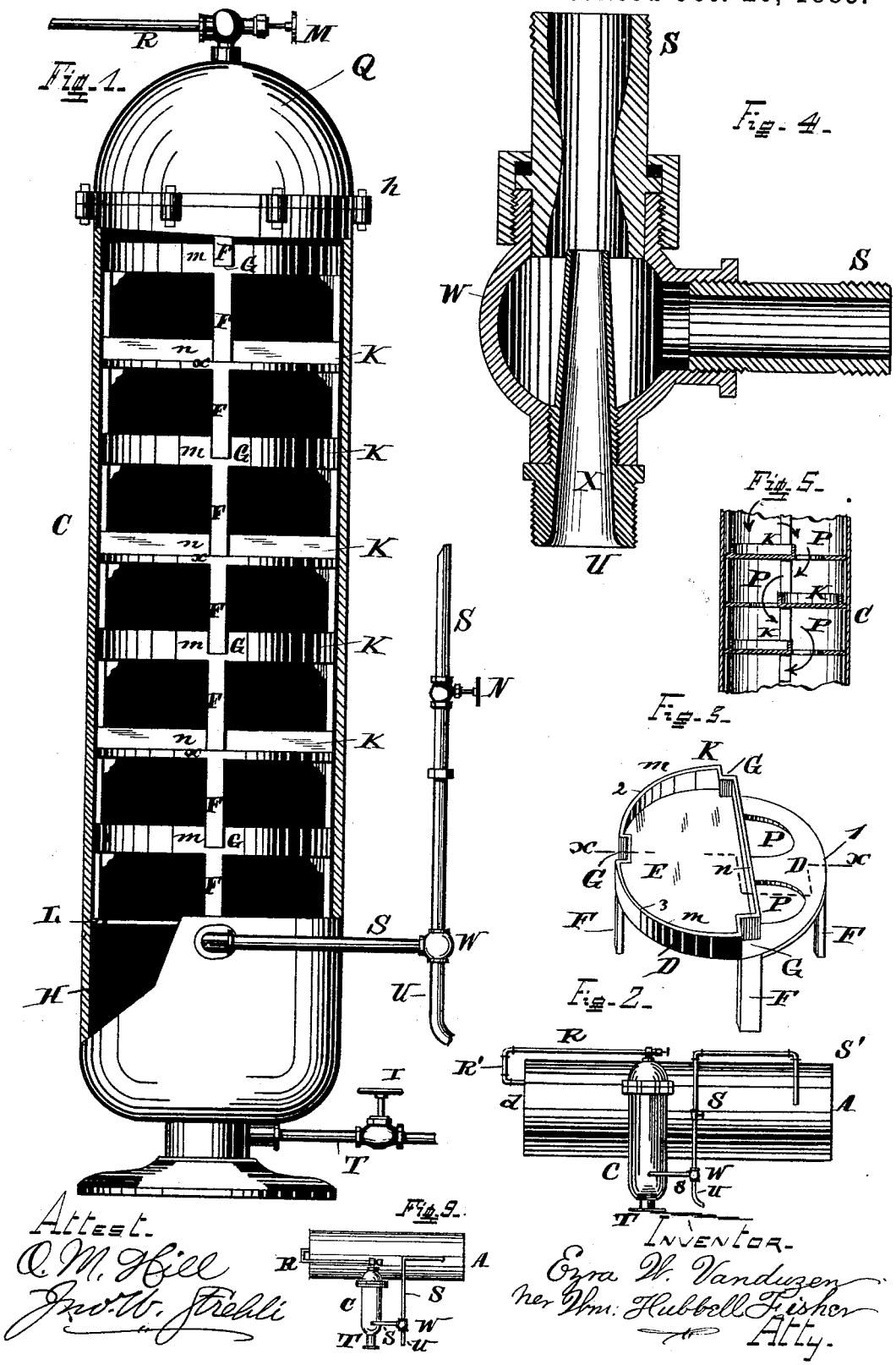

UNITED STATES PATENT OFFICE.

EZRA W. VANDUZEN, OF NEWPORT, KENTUCKY.

DEVICE FOR PURIFYING THE WATER OF BOILERS.

SPECIFICATION forming part of Letters Patent No. 328,548, dated October 20, 1885.

Application filed December 15, 1884. Serial No. 150,380. (No model.)

*To all whom it may concern:*

Be it known that I, EZRA W. VANDUZEN, a resident of the city of Newport, in the county of Campbell and State of Kentucky, have invented certain new and useful Improvements in Devices for Purifying the Water of Boilers, of which the following is a specification.

The several features of my invention, and the various advantages resulting from their use, conjointly or otherwise, will be fully hereinafter set forth.

In the accompanying drawings, making part of this specification, Figure 1, Sheet 1, represents a side view of a preferred kind of purifying-vessel, the upper and lower ends and connections being shown in exterior elevation, a portion of the lower end of the vessel being broken away, and the central portion of the vessel being shown in vertical central section, the collectors within the vessel being in elevation. Fig. 2, Sheet 1, is a side elevation, on a diminished scale, of a boiler and the purifying-vessel, and showing a preferred location and arrangement of the boiler, purifying-vessel, and pump or injector. Fig. 3, Sheet 1, is a perspective view of one of the segment-receiving pans of the purifying-vessel. Fig. 4, Sheet 1, is a vertical central section of the injector. Fig. 5, Sheet 1, is a vertical section on a diminished scale taken at the line $x\ x$ of Fig. 3, and showing the central or middle portion of the purifying-vessel and three collectors in position. Fig. 6, Sheet 2, is a perspective view of a novel form of skimmer to be used in the boiler, and preferably in connection with an external purifying-vessel. Fig. 7, Sheet 2, is a vertical transverse section of a flue-boiler, showing in front elevation one of said skimmers connected to the end of the boiler. Fig. 8, Sheet 2, is a vertical central longitudinal section of a flue-boiler, showing one of said skimmers connected to the end of the boiler and one of the skimmers connected to the side of said boiler. Fig. 9, Sheet 1, represents, on a diminished scale, a side elevation illustrating a modification of certain features of my invention.

A indicates a boiler, which may be of any suitable shape and construction, and which may be an upright boiler, or a horizontal one, as preferred. Furthermore, it may have tubes or flues, or be without either.

In Figs. 7 and 8 a horizontal boiler is shown with horizontal flues B.

C indicates the purifying-vessel taking the form of an upright cylinder, as shown.

One feature of my invention consists in the novel construction of the collectors for collecting sediment and other impurities held in suspension in the water, and their arrangement in the purifying-vessel. These pans are constructed as follows:

D indicates the supporting-plate or frame-work of the pan. At one side this plate is imperforate, and has at its edge the upright flange $m$. An upright flange, $n$, extends across the frame-work at or near the center of the latter, and is connected at each end to the adjacent end of flange $m$. In this way the pan E is formed. That part of the supporting-plate or frame-work D not within said pan E is perforate. In the drawings two openings, P, are shown extending through said plate. The number and size of these openings may be varied at will. The supporting-plate is suitably supported. In the drawings are shown legs F, preferably four in number, and these are the preferred means of support.

The collectors are placed one above another in the purifying-vessel.

As a chamber, H, in the bottom of the vessel C is preferably present, as shown, for reasons hereinafter given, the legs of the first pan will rest upon a supporting-ledge, L, or ring located at the inner side of the vessel, and connected thereto, usually by being cast therewith. Upon this first collector is set a second one, the legs of the latter resting on the plate D. The pan E of this second collector is on that side of the vessel C which is opposite where the pan E of the first collector, K, is. At the junction of flanges $n$ and $m$ of pan E of each collector the recesses G are formed, and a recess G is likewise present in the flange $m$, at or near its mid-length. Into each recess G of the first collector a leg of the second collector fits and rests on plate D. On the second collector is placed a third collector, K, whose legs fit into the recesses G of the second collector, the pan E of the third collector being on the same side as the pan of the first collector. In this manner collector after collector is placed in the vessel C, one collector above another, the pan of adjacent collectors being on opposite sides of vessel C, until the desired number of collectors are in position. Usually the entire vessel C above edge L is filled with collectors. The sides of the recesses G serve, first, as a convenient guide in setting the collector in position upon the collector beneath, and also prevent the collectors, when set in position, from slipping or getting out of position with reference to one another.

When the purifying-vessel is small, three legs under each collector will be sufficient, and will then preferably be located at the points 1, 2, and 3, (see Fig. 3,) and one recess will be omitted, and the remaining recesses will be formed at the points 2 and 3, instead of at the corners of the pan E.

The conduit R connects the water in the boiler A with the top portion of purifying-vessel C, and the conduit S connects the lower portion of the vessel C with the water of the boiler. At a convenient point between the purifying-vessel and the boiler the feed-water pipe U communicates with conduit S. The feed-water is forced through pipe U and through conduit S into the boiler by a pump or injector, (not shown,) to which pipe U is connected.

That end of the conduit R which is in the boiler is preferably located at or near the surface of the water in the boiler. That end of the conduit S which is in the boiler is preferably located farther below the surface of the water in the boiler than is the said end of conduit R. The object of thus locating said ends of said conduits will be hereinafter explained.

The general operation of the devices thus far described is as follows: The boiler being duly filled with water and heated to the boiling-point, the water flows up through conduit R into the top of the purifying-vessel C, and there flows down into upper collector, K, filling pan E, passing over the flange n, through openings P, thence filling pan E of the next lower collector, K, thence, passing across its flange n, passes down through its opening P. In like manner the water passes down over each collector K, and filling its pan, and finally fills bottom chamber, H. The water thence passes through conduit S to the boiler. During the passage of the water through the purifier it becomes somewhat cooled and deposits the dirt, foreign matters, and impurities it has held in suspension. The foreign matters and impurities settle in pans E and on the plate D, around the edges of the openings P, and also in the chamber H. This latter chamber being of large extent, and for the most part being below the line of agitation caused by current of the water passing out from the purifying-vessel through conduit S, the impurities still remaining in the water after passing the collectors K, have full opportunity to quietly settle in said chamber. Thus the water will, in passing through the purifying-vessel, be freed of impurities and pass in a pure condition through conduit S to the boiler. As the outlet of conduit S is lower than the inlet of conduit R the circulation of water will be continued through the purifying-vessel without the aid of a pump or injector or jet-pump. Hot water, being lighter than cold water, passes up through conduit R and into the purifying-vessel, and there purifies itself, and, cooling, passes down out through the conduit S and into the boiler. The exit-orifice of limb S' of conduit S being lower than inlet-orifice of limb R' of conduit R, the water in limb S', being colder and heavier than the hot water in limb R', falls through limb S' into the boiler, and the hot water from the boiler flows through limb R'.

As it is necessary to supply the boiler with fresh water equal to the amount used in steam, the pipe U for supplying this fresh water is preferably connected, as shown, to the conduit S. The action of any pump or injector (of suitable description, but not herein shown) connected to the pipe U impels the water through said pipe and conduit S into the boiler, and also accelerates the circulation of water from the boiler through the purifying-vessel by means of a water-jet pump, W. This jet-pump is preferably located at the junction of the pipe U with conduit S. The nozzle of the jet-pump is indicated by X, (see Fig. 4,) and the longitudinal axis of said nozzle is parallel to the axis of the conduit S and points in a direction coincident with the movement of a current through the conduit S from the purifying-chamber to the boiler.

In the conduit S, between the junction of pipe U therewith and the boiler, the fresh impure water mingles with the purified water coming from the purifying-vessel and both are simultaneously discharged into the boiler. Thus commingled they are taken up in turn by conduit R and passed through the purifier and cleansed. In this manner the process of purifying the water of the boiler and the supplying of fresh water thereto are continued.

When the feed-water is obtained from a reservoir elevated above the boiler, and its pressure exceeds the pressure of steam in the boiler, the pump or the injector may be dispensed with.

Where means (as the pump, injector, or head of water in pipe U) for causing circulation through conduit S and the purifying-vessel are present, the conduits R and S need not be arranged so as that a circulation through them shall be caused by means of the siphon action.

The inlet end of conduit R and delivery end of conduit S are preferably respectively located at opposite ends of the boiler to enable the water entering the boiler to be thoroughly heated and the lighter foreign matters to be raised to the surface by ebullition before entering the conduit R, and so as to create a circulation through the boiler. For the purpose of more thoroughly insuring that these lighter matters held in suspension and present at or near the surface of the water shall duly enter the conduit R, I provide a skimmer, located at the inlet-end of said conduit R.

I will now describe the preferred and novel form of skimmer. It consists, primarily, of a vessel, Z, open at the top and having its front a and ends b b provided with vertical slots d. The plates e, into which the front and ends are thus divided, are at one edge bent inwardly and operate as deflectors, and will hereinafter be denominated by the latter term.

The back side, f, of the skimmer is preferably solid, as shown, and will be shaped to conform to that portion of the boiler to which the same is to be connected. Thus when the back f of the skimmer is to rest against the flat end of the boiler it will be flat. (See Fig. 6 and the right-hand end of Fig. 8.) Where the back f rests against the curved side of a cylindrical boiler, it will be curved to everywhere rest against said side of the boiler. The skimmer is suitably secured to the boiler, a preferred method being by extending up the back f and bolting the extended part to the boiler.

The exit-orifice g of the skimmer is connected with conduit R, and is placed at or near the bottom of the skimmer. The exit-orifice g is preferably located centrally in the skimmer with reference to its length, but may be placed nearer one end.

Where two or more exit-orifices are employed, they will be connected to the conduit R, usually by branch tubes. One edge of each deflector is usually turned inwardly, and that edge of each deflector which is nearest the exit-orifice g is turned inward to cause the water to flow through the slots d in a direction toward the exit-orifice. The deflectors, also, are preferably inclined downward toward the back, and thus still further aid in directing the water into the skimmer and toward exit orifice or orifices g.

The skimmer is located at or near the surface of the water, and is preferably located so that the upper edge of the deflectors is on a level with the standard water-line of the boiler, and the bottom of slots f shall be below the low-water line of the boiler. As the water rises or falls in the boiler the lighter impurities at or just below the surface of the water and the scum formed thereon will be drawn into the skimmer and prevented from escaping again into the boiler, and will be carried into the conduit R, and thence into the purifying-vessel, along with the heavier particles or matters held in suspension in the water, and will there be deposited in the purifying-vessel.

In cleaning the purifying-vessel the valve M in conduit R and the valve N in conduit S are closed, and blow-off pipe T is opened by turning valve I. The pressure of steam in the vessel C will force the water rapidly through it, cleansing the pans E and plates D, and ledge L and chamber H, carrying the impurities away through the blow-off pipe T. After this has been done the valve M in conduit R is preferably opened for a few moments, and steam and water from the boiler will rapidly pass through the purifying-vessel and remove any impurities remaining in pans E, and on the plates D, and chamber H, and carry these impurities out through blow-off pipe T. After the purifying-vessel has been cleansed the valve I is closed and valves M and N opened, and the regular operations of purifying the water of the boiler and feeding it to the latter are resumed.

In so far as the conduit-pipe R for delivering water from the boiler to a purifying-vessel is concerned, and the junction of the supply-pipe U with a conduit, S, discharging the water coming from said vessel and from pipe U to the boiler is concerned, the particular construction of the purifying-vessel is not material.

The novel description of skimmer may be used with any desired form of purifying-vessel, or to skim the upper portion of the water in the boiler when the said vessel and the said circulation are omitted or changed.

The purifying-vessel, as well as its peculiarly-constructed collectors, may be employed in circulatory systems other than that particularly herein set forth. I prefer, however, to employ all of the parts in the relations shown as productive of the best results in the purification of the water.

It may be here remarked that it is not vitally necessary that the current of water from the boiler should flow down through the purifying-vessel. The conduit R may be connected to the bottom portion of the vessel, where conduit S is shown to be connected, and the conduit S may be connected to the top of the said vessel. In such event the water will flow up through the said vessel; but it is better that the water flow downward through the vessel, as shown.

The purifying-vessel may be cylindrical, as shown, or polygonal, square, &c., and its breadth may be greater than its height, the collectors being correspondingly shaped as to extent and outer configuration.

The purifying-vessel is made in two or more parts to enable it to be opened and the collectors inserted. In the present illustrative instance the cap Q is for this purpose separable from the main body of the purifying-vessel, and is secured thereto by bolts h.

When desired, the downward-extending vertical limb R' of conduit R and downwardly-extending vertical limb S' of conduit S may be omitted, and the conduits R and S be connected to the boiler, substantially as shown in Fig. 9, in which event the water, in passing through the circulatory system of conduits and purifier, will not rise above the junction of conduit R with the boiler.

What I claim as new and of my invention, and desire to secure by Letters Patent, is—

1. The combination of a boiler, a purifying-vessel, a conduit connecting the receiving end of the purifying-vessel with the boiler, a conduit connecting the delivering end of the purifying-vessel with the boiler, and a feed-water supply-pipe connected to that one of the aforesaid conduits which delivers to the boiler the water purified by the said purifying-vessel, substantially as and for the purposes specified.

2. The combination of a boiler, a purifying-vessel, a conduit connecting the boiler with the receiving end of the purifying-vessel, a conduit connecting the delivery end of the purifying-vessel with the boiler, a feed-water-supply pipe connected to said last-named conduit, and a jet-pump located at the junction of the feed-water-supply pipe with said last-named conduit, substantially as and for the purposes specified.

3. The combination of boiler, conduit R, a purifying-vessel, conduit S, feed-pipe U, joined to conduit S, and jet-pump W, the exit-orifice of conduit S being at a lower level in the boiler than inlet-orifice of conduit R, substantially as and for the purposes specified.

4. In a purifying-vessel, a collector consisting of plate D, having pan E, and perforations P, substantially as and for the purposes specified.

5. In a purifying-vessel, a collector consisting of plate D, having pan E and perforations, and legs F, substantially as and for the purposes specified.

6. In a purifying-vessel, collectors each having plate D, perforated, and pan E, having flange m and flange n crossing the collector, and provided with recesses G and legs F, the pans of adjacent collectors being opposite located in the vessel to compel the water passing through the vessel to take a zigzag course, substantially as and for the purposes specified.

7. In a purifying-vessel, the collectors each having frame-work or plate perforated at one side, and having pan E at the other side, and recesses G at each corner of the pan, and recess G at the mid-length of flange or wall m, and legs F, the pan of each collector being at the opposite side of the purifying-vessel to what its adjacent collector is, substantially as and for the purposes specified.

8. The combination of the purifying-vessel, collectors having pans E, perforated plate or frame-work D, legs F, ledge L, and chamber H, substantially as and for the purposes specified.

9. The combination of boiler, conduit R, the purifying-vessel, collectors having pans E, perforated plate or frame-work D, legs F, and conduit S, substantially as and for the purposes specified.

10. The skimmer consisting of the deflectors e and back f, and exit-orifice, substantially as and for the purposes specified.

11. The skimmer consisting of the deflectors e, bent inwardly toward the exit-orifice, substantially as and for the purposes specified.

12. The skimmer consisting of the deflectors e bent inwardly toward the exit-orifice, and back f, having the exit-orifice, substantially as and for the purposes specified.

13. The combination of boiler, conduit R, the purifying-vessel, collectors having pans E, perforated plate or frame-work D, legs F, conduit S, and supply-pipe U, and jet-pump W, substantially as and for the purposes specified.

14. The skimmer consisting of the deflectors e, bent inwardly and inclined downwardly toward the exit-orifice, substantially as and for the purposes specified.

15. The skimmer consisting of the deflectors e, bent inwardly and inclined downwardly toward the exit-orifice, and back f, having the exit-orifice, substantially as and for the purposes specified.

16. The combination of the back f and front a and ends b b, having deflectors, and the boiler, the back f, being secured against the shell of the boiler and shaped to conform to the shape of the said shell, substantially as and for the purposes specified.

17. The combination of the skimmer provided with deflectors e, boiler, exit-orifice g, conduit R, a purifying-vessel, and conduit S, substantially as and for the purposes specified.

18. The combination of the boiler, skimmer provided with deflectors e, a purifying-vessel and conduit S, supply-pipe U, and jet-pump W, substantially as and for the purposes specified.

19. The combination of the boiler, skimmer provided with deflectors e, exit-orifice, conduit R, purifying-vessel having collectors K, provided with pans E, and perforations P, arranged as described, and conduit S, substantially as and for the purposes specified.

20. The combination of the boiler, skimmer provided with deflectors e, exit-orifice, conduit R, purifying-vessel having collectors K, provided with pans E, and perforations P, arranged as described, and supply-pipe U, and jet-pump, substantially as and for the purposes specified.

EZRA W. VANDUZEN.

Witnesses:
JNO. W. STREHLI,
O. M. HILL.